United States Patent
Kato et al.

(10) Patent No.: US 9,400,046 B2
(45) Date of Patent: Jul. 26, 2016

(54) CHAIN GUIDE AND CHAIN TRANSMISSION DEVICE

(71) Applicants: Akio Kato, Shizuoka (JP); Shinji Oishi, Shizuoka (JP); Goro Nakao, Shizuoka (JP); Makoto Okasaka, Shizuoka (JP); Takashi Tsujimoto, Shizuoka (JP)

(72) Inventors: Akio Kato, Shizuoka (JP); Shinji Oishi, Shizuoka (JP); Goro Nakao, Shizuoka (JP); Makoto Okasaka, Shizuoka (JP); Takashi Tsujimoto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 83 days.

(21) Appl. No.: 14/402,340

(22) PCT Filed: May 24, 2013

(86) PCT No.: PCT/JP2013/064467
§ 371 (c)(1),
(2) Date: Nov. 20, 2014

(87) PCT Pub. No.: WO2013/176248
PCT Pub. Date: Nov. 28, 2013

(65) Prior Publication Data
US 2015/0105197 A1 Apr. 16, 2015

(30) Foreign Application Priority Data

May 24, 2012 (JP) ................. 2012-118389
Aug. 27, 2012 (JP) ................. 2012-186235

(51) Int. Cl.
*F16H 7/12* (2006.01)
*F16H 57/04* (2010.01)
(Continued)

(52) U.S. Cl.
CPC ............ *F16H 57/0427* (2013.01); *F01L 1/022* (2013.01); *F16C 13/006* (2013.01);
(Continued)

(58) Field of Classification Search
CPC ............... F16H 2007/0874; F16H 2007/0865; F16H 7/1281; F16H 7/1254; F16C 13/006
USPC ............................. 474/111, 134, 91
See application file for complete search history.

(56) References Cited

U.S. PATENT DOCUMENTS 68,625 A * 9/1867 Hawley ................. 474/131
993,684 A * 5/1911 Vom Hoff ............ F16H 7/1281
474/131

(Continued)

FOREIGN PATENT DOCUMENTS

JP 43-031780 12/1968
JP 01-083920 6/1989
(Continued)

OTHER PUBLICATIONS

European Search Report issued May 12, 2015 in corresponding European Patent Application No. 13 79 3188.
(Continued)

*Primary Examiner* — Henry Liu
(74) *Attorney, Agent, or Firm* — Wenderoth, Lind & Ponack, L.L.P.

(57) ABSTRACT

A chain guide includes roller element bearings adapted to guide, while rolling, a timing chain through which torque is transmitted. The chain guide further includes a guide base arranged along one side of the timing chain and having an opposed pair of side plates. Each side plate is formed with plural shaft engaging portions arranged so as to lie on a circular arc. The chain guide further includes roller shafts having their ends supported by the respective shaft engaging portions, and rotatably supporting the roller element bearings. An oil guide hole is formed in a wall surface of each shaft engaging portion facing the end surface of the roller shaft so as to extend through the side plate to its outer side surface.

11 Claims, 9 Drawing Sheets

(51) Int. Cl.
*F16H 7/18* (2006.01)
*F16C 35/04* (2006.01)
*F16C 13/00* (2006.01)
*F16H 57/05* (2006.01)
*F16C 19/26* (2006.01)
*F16C 33/66* (2006.01)
*F01L 1/02* (2006.01)
*F16H 7/08* (2006.01)

(52) U.S. Cl.
CPC .............. *F16C 19/26* (2013.01); *F16C 33/66* (2013.01); *F16C 35/045* (2013.01); *F16H 7/08* (2013.01); *F16H 7/18* (2013.01); *F16H 57/0471* (2013.01); *F16H 57/05* (2013.01); *F16H 57/04* (2013.01); *F16H 2007/0865* (2013.01); *F16H 2007/0874* (2013.01); *F16H 2007/0893* (2013.01)

(56) References Cited

U.S. PATENT DOCUMENTS

| | | | | |
|---|---|---|---|---|
| 1,338,293 A * | 4/1920 | Fuchs | F16H 7/1254 | 474/134 |
| 1,480,078 A * | 1/1924 | Kegresse | B62D 55/108 | 180/9.62 |
| 1,499,920 A * | 7/1924 | Godden | B65G 13/11 | 193/37 |
| 1,579,245 A * | 4/1926 | Pennington | B62D 55/108 | 305/134 |
| 2,341,273 A * | 2/1944 | Helberg | B64C 13/30 | 474/109 |
| 2,349,281 A * | 5/1944 | Kendall | F16H 7/20 | 29/898.057 |
| 2,709,371 A * | 5/1955 | Hale | D05B 59/00 | 112/279 |
| 2,729,110 A * | 1/1956 | Killian | F16H 55/171 | 474/153 |
| 2,827,153 A * | 3/1958 | Olk | B65G 13/071 | 193/35 R |
| 2,892,206 A * | 6/1959 | Deibel | B60S 1/20 | 15/250.25 |
| 2,964,155 A * | 12/1960 | Flowers | B65G 13/11 | 193/35 R |
| 3,586,142 A * | 6/1971 | Inwood | B65G 1/023 | 193/35 R |
| 3,598,194 A * | 8/1971 | Wappler | B60K 17/36 | 180/6.2 |
| 3,888,217 A * | 6/1975 | Hisserich | F01L 1/024 | 123/90.15 |
| 3,930,323 A * | 1/1976 | Marold | E02F 3/6454 | 198/813 |
| 3,950,046 A * | 4/1976 | Lubbersmeyer | F16C 13/006 | 384/546 |
| 3,951,484 A * | 4/1976 | Bowman, Jr. | B65G 21/16 | 104/172.2 |
| 4,068,535 A * | 1/1978 | Sheets | F16H 7/1254 | 474/132 |
| 4,078,642 A * | 3/1978 | Payne | B65G 39/09 | 193/37 |
| 4,208,078 A * | 6/1980 | Miki | F16C 33/467 | 29/898.061 |
| 4,213,523 A * | 7/1980 | Frost | B65G 39/09 | 193/37 |
| 4,416,647 A * | 11/1983 | White, Jr. | F16H 7/1281 | 474/134 |
| 4,416,648 A * | 11/1983 | Radocaj | F16H 7/1272 | 474/135 |
| 4,474,562 A * | 10/1984 | Heurich | F16H 7/1281 | 29/517 |
| 4,610,646 A * | 9/1986 | Walter | F16C 13/006 | 474/174 |
| 4,626,231 A * | 12/1986 | Nagano | F16D 1/076 | 29/465 |
| 4,723,516 A * | 2/1988 | Slagley | F01L 1/348 | 123/90.16 |
| 4,767,387 A * | 8/1988 | Matsuoka | B21D 53/261 | 474/168 |
| 4,892,508 A * | 1/1990 | Ryan | B61B 12/06 | 105/151 |
| 4,908,006 A * | 3/1990 | Burysek | D01H 1/241 | 474/117 |
| 4,913,689 A * | 4/1990 | Morishita | B21H 1/04 | 474/170 |
| 4,969,548 A * | 11/1990 | Kornylak | F16C 13/006 | 193/35 R |
| 4,981,116 A * | 1/1991 | Trinquard | F02B 67/06 | 123/90.31 |
| 5,244,439 A * | 9/1993 | Rogus | F16H 7/1263 | 474/136 |
| 5,441,354 A * | 8/1995 | Broder | B41J 29/02 | 226/181 |
| 5,441,458 A * | 8/1995 | Rogus | F16H 7/1245 | 198/826 |
| 5,848,846 A * | 12/1998 | Sugiyama | F16C 19/466 | 29/898.061 |
| 5,961,411 A * | 10/1999 | Tsutsumi | F16H 7/18 | 474/111 |
| 5,967,925 A * | 10/1999 | Meckstroth | F16H 55/38 | 474/168 |
| 6,041,490 A * | 3/2000 | Tabuchi | B21H 1/04 | 29/602.1 |
| 6,062,998 A * | 5/2000 | Kumakura | F16H 7/18 | 474/110 |
| 6,179,740 B1 * | 1/2001 | Walker | F16H 7/1254 | 474/134 |
| 6,189,639 B1 * | 2/2001 | Fuse | B62M 9/00 | 180/231 |
| 6,196,375 B1 * | 3/2001 | Cozza | B65G 21/2054 | 193/35 C |
| 6,220,211 B1 * | 4/2001 | Line | F01L 1/348 | 123/90.15 |
| 6,245,436 B1 * | 6/2001 | Boyle | C25D 11/026 | 428/472.2 |
| 6,254,503 B1 * | 7/2001 | Chiba | F16H 55/56 | 29/894 |
| 6,346,057 B1 * | 2/2002 | Edelmann | B65G 15/02 | 474/110 |
| 7,104,909 B2 * | 9/2006 | Asbeck | F16H 7/1218 | 474/112 |
| 7,419,447 B2 * | 9/2008 | Serkh | F16H 7/1218 | 474/117 |
| 7,780,556 B2 * | 8/2010 | Sakanaka | F16G 5/16 | 474/174 |
| 7,866,292 B2 * | 1/2011 | LaBere | F01L 1/02 | 123/90.15 |
| 7,909,717 B2 * | 3/2011 | Boussaguet | F16C 13/006 | 474/136 |
| 8,282,289 B2 * | 10/2012 | Oishi | F16C 33/541 | 384/564 |
| 8,684,895 B2 * | 4/2014 | Severing | C21D 5/00 | 492/1 |
| 2001/0053727 A1 * | 12/2001 | Nakashima | F16G 5/166 | 474/242 |
| 2003/0092521 A1 * | 5/2003 | Konno | F16H 7/18 | 474/111 |
| 2004/0002401 A1 * | 1/2004 | Iverson | F16H 7/1254 | 474/134 |
| 2004/0116224 A1 * | 6/2004 | Sakamoto | F16H 55/30 | 474/152 |
| 2005/0031240 A1 * | 2/2005 | Dodoro | F16C 19/163 | 384/494 |
| 2006/0153485 A1 * | 7/2006 | Maeda | F16C 19/44 | 384/569 |
| 2007/0026986 A1 * | 2/2007 | Walker | F16H 7/1254 | 474/134 |
| 2007/0110348 A1 * | 5/2007 | Obara | F16C 17/026 | 384/107 |
| 2008/0070731 A1 * | 3/2008 | Vrsek | F01L 1/348 | 474/134 |
| 2009/0215569 A1 | 8/2009 | Shibukawa et al. | | |
| 2010/0160102 A1 * | 6/2010 | Haag | C23C 22/53 | 474/166 |

(56) References Cited

U.S. PATENT DOCUMENTS

| | | | |
|---|---|---|---|
| 2011/0294612 A1* | 12/2011 | Kato | F16H 7/08 474/91 |
| 2013/0324339 A1* | 12/2013 | Kato | F16H 7/18 474/137 |
| 2013/0331211 A1* | 12/2013 | Kato | F16H 7/18 474/101 |

FOREIGN PATENT DOCUMENTS

| | | |
|---|---|---|
| JP | 2004-091060 | 3/2004 |
| JP | 2011-047473 | 3/2011 |
| JP | 2011-058552 | 3/2011 |
| WO | 2010/090139 | 8/2010 |

OTHER PUBLICATIONS

International Search Report issued Jul. 2, 2013 in International (PCT) Application No. PCT/JP2013/064467.

Written Opinion of the International Searching Authority Report issued Jul. 2, 2013 in International (PCT) Application No. PCT/JP2013/064467 (with English translation).

* cited by examiner

CHAIN GUIDE AND CHAIN TRANSMISSION DEVICE

TECHNICAL FIELD

This invention relates to a chain guide used to adjust tension of a chain or guide the movement of the chain, and a chain transmission device including such a chain guide.

BACKGROUND ART

A chain transmission device includes a driving sprocket mounted to a crankshaft, a driven sprocket mounted to a camshaft, and a timing chain trained around the driving sprocket and the driven sprocket and configured to drive the camshaft. Such a chain transmission device further includes a chain guide provided on one side of the slack side of the timing chain and pivotable about a first end thereof, and a chain tensioner configured to apply an adjusting force to a second end of the chain guide remote from the first end so as to apply tension to the timing chain, thereby preventing the chain from slackening and flapping.

Typically, such a chain transmission device further includes a fixed chain guide provided along the tension side of the timing chain to guide the movement of the timing chain, thereby further reducing flapping of the chain.

Such chain guides, used to adjust tension or guide movement, of the timing chain, include those of the type which guide the timing chain by sliding surface contact with the timing chain. This type of chain guides, however, have a problem in that they offer a large moving resistance to the timing chain, thus increasing transmission torque loss.

The applicant proposed a chain guide in the below-identified Patent document 1 which is free of this problem. This chain guide includes a guide base elongated in the travel direction of the timing chain, and a plurality of roller shafts arranged along a curved line and having their both ends supported by the guide base. Rollers in the form of roller element bearings are rotatably supported by the respective roller shafts so that the timing chain is movably supported by the rollers.

This chain guide is advantageous in that since the timing chain is guided by the rollers with the rollers rolling, the chain guide hardly offers a moving resistance to the timing chain, thus minimizing transmission torque loss.

PRIOR ART DOCUMENT(S)

Patent Document(s)

Patent document 1: WO2010/090139A

SUMMARY OF THE INVENTION

Object of the Invention

The chain guide disclosed in Patent document 1 is configured such that oil is discharged from an oil outlet of a lubricator mounted to the engine or oil is fed into the tensioner and discharged from the distal end of the tensioner, and the discharged oil is splashed and adhered to the outer races of the roller element bearings and the radially outer surfaces of the roller shafts, thereby lubricating the roller element bearings. However, this chain guide has a problem in that oil cannot be sufficiently smoothly introduced into the roller element bearings, and thus it is difficult to sufficiently lubricate the roller element bearings.

An object of the present invention is to better lubricate the roller element bearings for guiding the timing chain while rolling.

In order to achieve this object, the present invention provides a chain guide comprising a guide base including an opposed pair of side plates elongated in one direction and configured to be arranged along a portion of the outer periphery of a timing chain such that the one direction coincides with the direction in which the timing chain moves, wherein each of the side plates is formed with shaft engaging portions that are opposed to the respective shaft engaging portions of the other of the side plates, a plurality of roller shafts arranged spaced apart from each other in the length direction of the side plates, and having end portions supported by the respective shaft support portions, and a plurality of rollers rotatably supported by the respective roller shafts and configured to guide the timing chain, wherein the rollers comprise roller element bearings each including an outer race and a plurality of roller elements mounted in the outer race, wherein oil guide holes are formed in each of the side plates at or around the respective shaft engaging portions to extend through the side plate from an inner side surface to an outer side surface, of the side plate.

The present invention also provides a chain transmission device comprising a driving sprocket, a driven sprocket, a timing chain trained around the driving sprocket and the driven sprocket, a pivotable chain guide provided on one side of the slack side of the timing chain so as to be pivotable about one end of the chain guide, and configured to guide the movement of the timing chain, and a chain tensioner configured to apply an adjusting force to the remote end of the chain guide remote from the one end of the chain guide so as to press the remote end against the timing chain, wherein the chain guide is the chain guide according to the present invention.

This chain transmission device preferably further comprises a stationary chain guide provided on one side of the tension side of the chain guide and configured to guide the movement of the timing chain, wherein the stationary chain guide is the chain guide according to the present invention. With this arrangement, it is possible to further effectively reduce flapping of the timing chain.

In this chain transmission device, as with conventional chain transmission devices, oil discharged from an oil outlet of a lubricating device mounted to the engine, or oil fed into the chain tensioner and discharged from the distal end of the tensioner is splashed, and the thus splashed oil is used to lubricate the roller element bearings. Splashed oil adheres to the radially outer surfaces of the outer races of the roller element bearings, the radially outer surfaces of the roller shafts, and the outer side surfaces of the side plates of the guide base.

Since the oil guide holes are formed in the wall surfaces of the tapered groove sections of the shaft engaging portions, which are formed on the side plates, so as to extend through the side plates to their outer side surfaces, oil adhered to the outer side surfaces of the side plates flows through the oil guide holes into the shaft engaging portions or their surrounding portions, then flows along the radially outer surfaces of the roller shafts, and flows into the roller element bearings together with oil that has already adhered to the roller shafts, thereby lubricating the roller element bearings.

Oil adhered to the outer side surfaces of the side plates is taken into the roller element bearings through the oil guide holes, and along the radially outer surfaces of the roller shafts in the above-described manner, and effectively lubricates the roller element bearings.

In a preferred arrangement, the roller shafts are formed with roller element rolling surfaces on the outer peripheries of the roller shafts, each of the roller element rolling surfaces is in contact at a contact portion with one of the roller elements of a corresponding one of the roller element bearings that lies in a loaded region where radial loads are applied to the one of the roller elements, and the oil guide holes lie on extensions of the respective contact portions. With this arrangement, lubricating oil can be more effectively taken into the roller element bearings.

By forming the guide base by molding a resin or by casting or die-casting a light metal such as an aluminum alloy or a magnesium alloy, it is possible to form the oil guide holes during molding or casting, which eliminates the necessity of after-processing, thus making it possible to reduce the processing cost.

Oil used to lubricate the roller element bearings may contain foreign matter. If such foreign matter enters at least one of the roller element bearings, foreign matter could be wedged between the bearing and the roller shaft, thus damaging the roller element bearing. Thus, preferably, each of the roller element bearings further comprises seals mounted at respective open ends of the outer race with gaps defined between the radially inner surfaces of the respective seals and the radially outer surface of the roller shaft so that the seals prevent entry of foreign matter into the respective roller element bearings.

Each of the shaft engaging portions may comprise a tapered groove section extending from the outer peripheral surface of the corresponding side plate facing the timing chain in the width direction of the side plate, and a circular shaft support section connected to the narrow end of the tapered groove section and configured to support one end the corresponding roller shaft, wherein the narrow end of the tapered groove section is configured to prevent the end of the roller shaft from being pulled out of the shaft support section, and wherein the oil guide holes are formed in the respective tapered groove sections.

In an alternative arrangement, each of the shaft engaging portions comprise a tapered groove section extending from the outer peripheral surface of the corresponding side plate facing the timing chain in the width direction of the side plate, and a shaft support section connected to the a narrow end of the tapered groove section and configured to support one end of the roller shaft, and for each of the shaft engaging portions, the shaft support section has on the inner periphery thereof an opposed pair of first flat surfaces which are kept in surface contact with second flat surfaces formed on the outer periphery of the roller shaft at the one end thereof, thereby preventing rotation of the one of the roller shafts, the tapered groove section has side surfaces connected to ends of the respective first flat surfaces, the tapered groove section has a wall surface facing the end surface of the roller shaft and formed with an anti-separation protrusion kept in engagement with the outer periphery of the one end of the roller shaft, and the tapered groove section is formed with one of the oil guide holes.

Further alternatively, the shaft engaging portions may comprise shaft holes extending through the respective side plates from one to the other side surface of each of the side plates, wherein the side plates are formed from a molten material by passing the molten material in the direction in which the shaft holes are to be arranged, such that a weld line is formed at a position downstream of each of the shaft holes. With this arrangement, since weld lines are formed in areas other than the loaded areas, the weld lines barely reduce the strength of the guide base, so that the guide base maintains high durability.

Advantages of the Invention

According to the present invention, by the provision of the oil guide holes at or around the shaft engaging portions, which support the roller shafts, so as to extend through the respective side plate from to the other side surface thereof, lubricating oil that has adhered to the outer side surfaces of the side plates can be fed into the roller element bearings through the oil guide holes, thus making it possible to lubricating the roller element bearings in an optimum manner.

Thus, the roller element bearings can be lubricated in an optimum manner, using only a conventional chain lubricating device and without the need for an additional dedicated lubricating device.

BEST MODE FOR EMBODYING THE INVENTION

Figure 1:
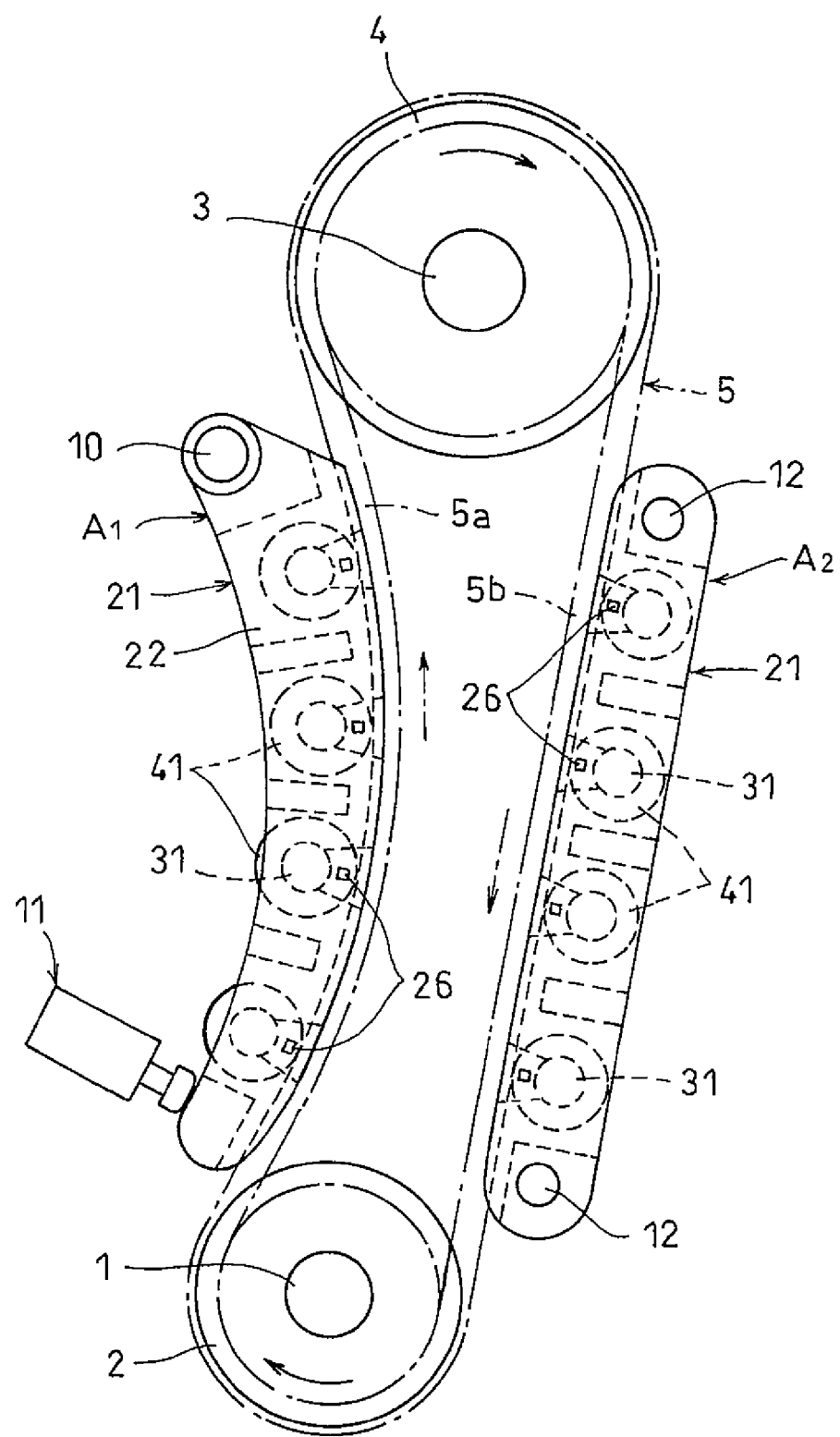
FIG. 1 is a schematic view of a chain transmission device embodying the present invention.

Now the embodiment of the present invention is described with reference to the drawings. FIG. 1 shows a chain transmission device for driving a camshaft which includes a driving sprocket 2 mounted to one end of a crankshaft 1, and a driven sprocket 4 mounted to one end of a camshaft 3. A timing chain 5 is trained around the driving and driven sprockets 2 and 4.

The timing chain 5 may be a roller chain or a silent chain.

The crankshaft 1 rotates in the direction shown by the arrow in FIG. 1. Thus, when the crankshaft 1 rotates, the timing chain 5 will move in the direction shown by the arrows in FIG. 1. As a result, the portion of the chain 5 moving upward becomes the slack side 5a, while the portion of the chain 5 moving downward becomes the tension side 5b. A chain guide $A_1$ is provided on one side of the slack side 5A of the chain 5.

The chain guide $A_1$ is elongated in the travel direction of the timing chain 5, and has its upper end portion supported by a pivot shaft 10 protruding from an engine block so as to be pivotable about the pivot shaft 10. A chain tensioner 11 is provided to apply its adjusting force to the lower end portion of the chain guide $A_1$, which is remote from the pivot center, thereby pressing the chain guide $A_1$ against the slack side 5a of the timing chain 5.

A chain guide $A_2$ is provided on the other side of the tension side 5b of the timing chain 5. The chain guide $A_2$ is elongated, as with the pivotable chain guide $A_1$, in the travel direction of the timing chain 5. The chain guide $A_2$ has both ends thereof fixed in position by tightening bolts 12 threaded into the engine block, and is configured to guide the movement of the timing chain 5.

The pivotable chain guide $A_1$ and the fixed chain guide $A_2$ are of the same structure, except that the pivotable chain guide $A_1$ is formed with holes at the top end portion through which the pivot shaft 10 is inserted, while the fixed chain guide $A_2$ is formed with holes at both end portions thereof through which the bolts 12 are inserted.

Thus, only the pivotable chain guide $A_1$ is described below, while elements of the fixed chain guide $A_2$ corresponding to those of the pivotable chain guide $A_1$ are denoted by identical numerals, and their description is omitted.

Figure 2:
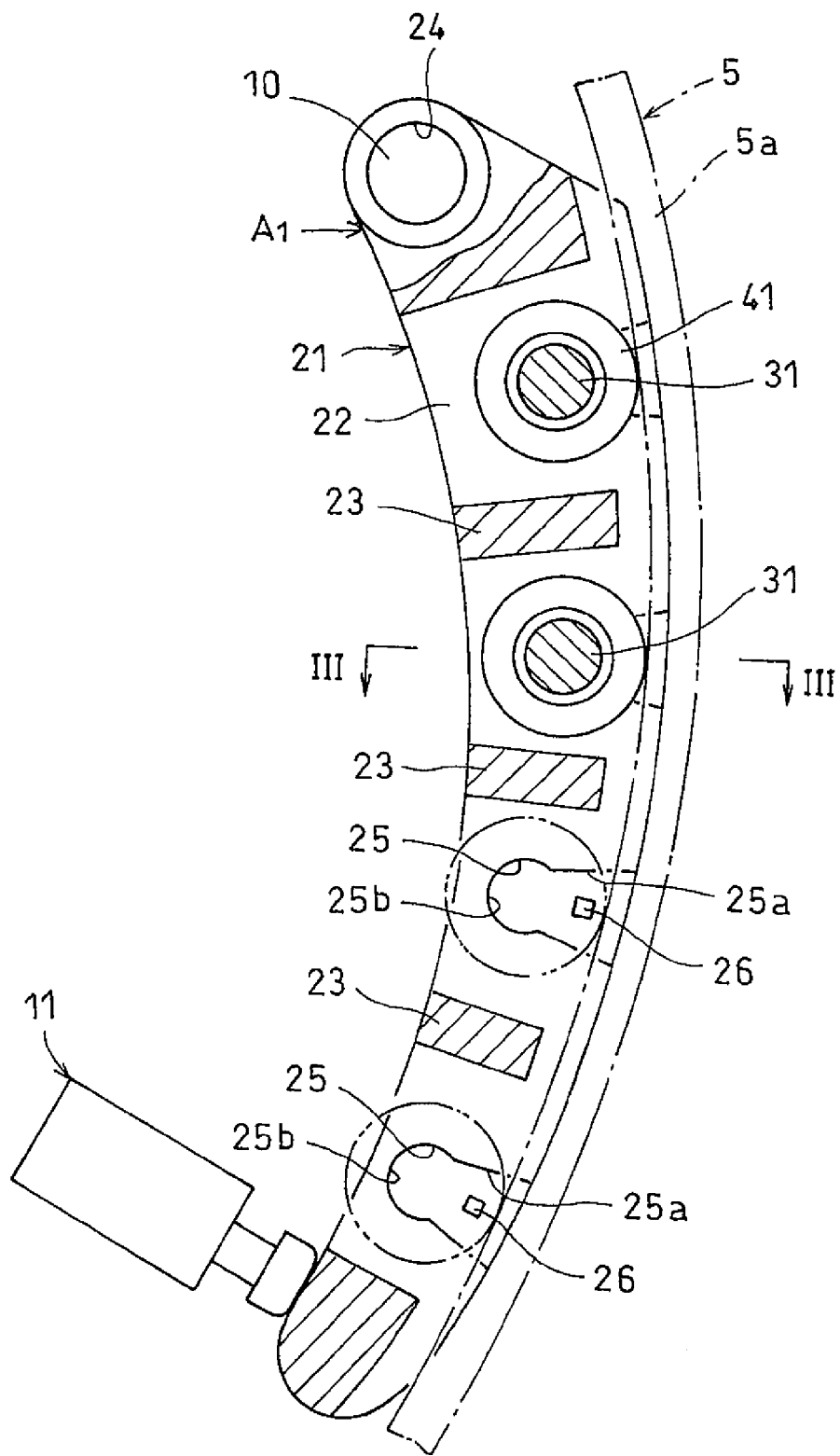
FIG. 2 is a vertical sectional view of a chain guide shown in FIG. 1.
Figure 3:
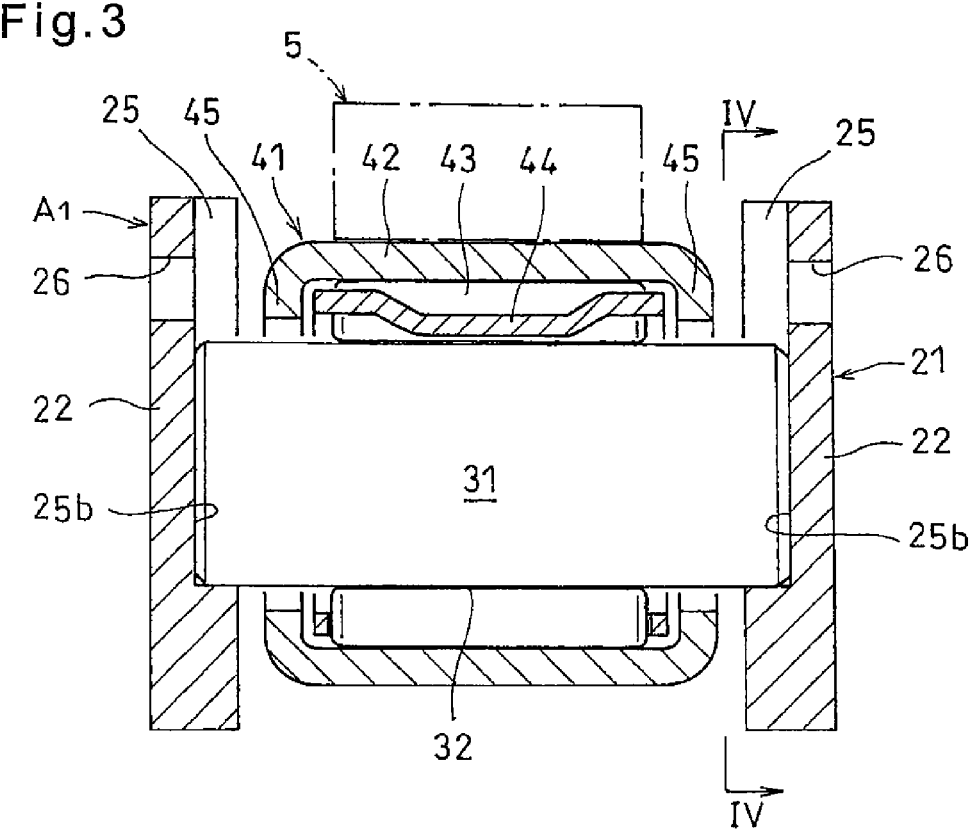
FIG. 3 is a sectional view taken along line III-III of FIG. 2.
Figure 4:
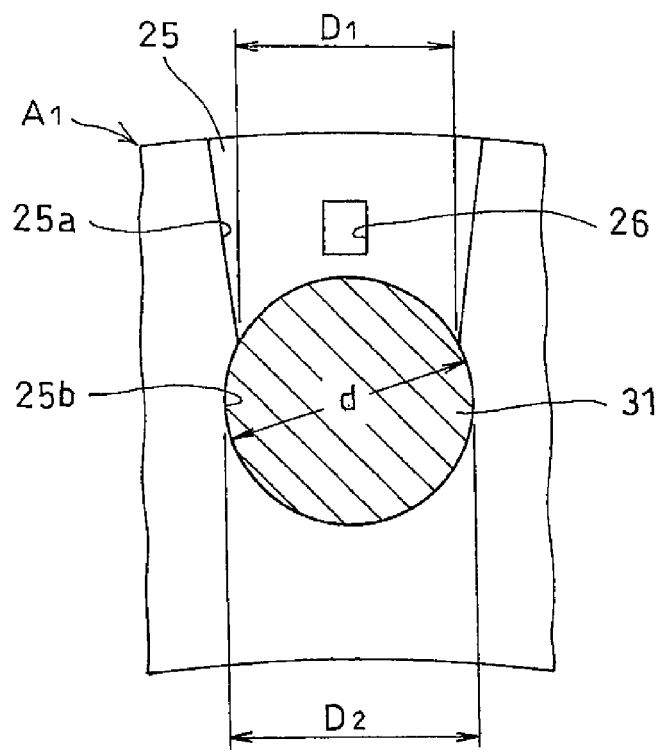
FIG. 4 is a sectional view taken along line IV-IV of FIG. 3.

As shown in FIGS. 2 to 4, the chain guide $A_1$ includes a guide base 21 elongated in the travel direction of the timing chain 5, and a plurality of roller shafts 31 arranged so as to be spaced apart from each other in the length direction of the guide base 21. Rollers 41 are rotatably mounted on the respective roller shafts 31.

The guide base 21 includes an opposed pair of side plates 22, and a plurality of spacer plates 23 provided between the side plates 22 so as to be spaced apart from each other in the length direction of the guide base 21. The side plates 22 are bow-shaped members formed with the insertion holes 24 at the top end portions thereof through which the pivot shaft 10 is inserted.

The respective opposed inner surfaces of the side plates 22 are formed with a plurality of shaft engaging portions 25 spaced apart from each other in the length direction of the side plates 22 and supporting the respective ends of the roller shafts 31.

Each shaft engaging portion 25 includes a tapered groove section 25*a* extending from the peripheral surface of the side plate 22 facing the timing chain 5 in the width direction of the side plate 22 and having a wide opening at the peripheral surface of the side plate 22. The shaft engaging portion 25 further includes a circular shaft support section 25*b* in the form a closed end portion and connected to a narrow end of the tapered groove section 25*a*. The roller shaft 31 is inserted through the tapered groove section 25*a* and fitted in and supported by the shaft support section 25*b*.

The tapered groove section 25*a* has a wall surface facing the end surface of the roller shaft 31 and formed with an oil guide hole 26 extending through the side plate 22 to its outer side surface.

The tapered groove sections 25*a* are dimensioned to satisfy the relation $d > D_2 > D_1$, where $D_1$ is the width of the narrow end of the tapered groove section 25*a*, $D_2$ is the inner diameter of the shaft support section 25*b*, and $d$ is the outer diameters of the roller shafts 31. The roller shafts 31 are pushed through the tapered groove sections 25*a* into the shaft support sections 25*b* and fitted in the shaft support sections 25*b* with an interference fit. In this state, the roller shafts 31 are prevented from being pulled out of the shaft support sections 25*b* by the narrow ends of the tapered groove sections 25*a*.

The shaft engaging portions 25 are arranged such that the centers of the shaft support sections 25*b* lie on a convex circular arc, but may be arranged such that they lie on a curved line other than a convex circular arc.

The guide base 21 is formed of a synthetic resin. The oil guide holes 26 are formed simultaneously when the guide base 21 is formed. The synthetic resin forming the guide base 21 is preferably an oil-resistant, weather-resistant, high-strength resin. Such resins include polyamide 46 (PA 46) and polyamide 66 (PA 66). In order to further improve the mechanical strength, the resin may be reinforced with glass fiber.

Instead, however, the guide base 21 may be formed by casting or die-casting a light metal such as an aluminum alloy or a magnesium alloy.

The roller shafts 31 are formed of SUJ2 or SU steel. In order to increase hardness, thereby improving wear resistance, the roller shafts 31 are subjected to heat treatment. Bright quenching is used as heat treatment in the embodiment, but induction hardening or carburizing hardening may be used instead, or further alternatively, carbonitriding treatment may be used.

The rollers 41 are rotatably supported by the respective roller shafts 31. The rollers 41 of the embodiment are roller element bearings each including an outer race 42, a plurality of roller elements 43 mounted in the outer race 42, and a retainer 44 retaining the roller elements 43.

The outer race 42 is a shell-shaped member formed by drawing a metal plate such as SPC or SCM. The outer race 42 is subjected to heat treatment to increase hardness. The shell-shaped outer race 42 has inwardly extending flanges 45 at both ends of the outer race 42 to prevent the retainer 44 from being pulled out of the outer race 42. In order that the roller element bearing 41 can be assembled more easily, the inwardly extending flanges 45 are formed by bending after the retainer 44 has been mounted to retainer the roller elements 43 in position.

The roller element bearings may be needle roller element bearings or cylindrical roller element bearings. The roller element bearing may also be full type roller element bearings, namely bearings including no retainer.

In this chain transmission device, while rotation torque is being transmitted from the crankshaft 1 to the cam shaft 3 due to movement of the timing chain 5, which is trained around the driving sprocket 2 and the driven sprocket 4, any change in tension of the timing chain 5 due to fluctuations in load is eliminated by the chain guide 11. The tension of the timing chain 5 is thus kept constant at all times.

While rotation torque is being transmitted from the crankshaft 1 to the camshaft 3, the rollers 41 of the pivotable chain guide $A_1$ and the fixed chain guide $A_2$, which comprise roller element bearings, rotate due to contact with the timing chain 5. That is, the timing chain is guided by the rollers 41 with the rollers 41 rolling on the chain 5.

Since the timing chain 5 is guided by the rollers 41 with the rollers 41 rolling on the chain 5, the chain guide 5 is less likely to become worn at its portion guided by the rollers 41. The rollers 41 offers less resistance to movement of the timing chain 5, thus allowing smooth movement of the timing chain 5, which in turn allows torque transmission with a minimum loss.

In this chain transmission device, as with conventional chain transmission devices, oil discharged from an oil outlet of a lubricating device mounted to the engine, or oil fed into the chain tensioner and discharged from the distal end of the tensioner is splashed, and the thus splashed oil is used to lubricate the roller element bearings 41. Splashed oil adheres to the radially outer surfaces of the outer races 42 of the roller element bearings 41, the radially outer surfaces of the roller shafts 31, and the outer side surfaces of the side plates 22 of the guide base 21.

Since the oil guide holes 26 are formed in the wall surfaces of the tapered groove sections 25*a* of the shaft engaging portions 25, which are formed on the side plates 22, so as to extend through the side plates 22 to their outer side surfaces, oil adhered to the outer side surfaces of the side plates 22 flows through the oil guide holes 26 into the tapered groove sections 25a, then flows along the radially outer surfaces of the roller shafts 31, and flows into the roller element bearings 41 together with oil that has already adhered to the radially outer surfaces of the roller shafts 31, thereby lubricating the roller element bearings 41.

Oil adhered to the outer side surfaces of the side plates 22 is taken into the roller element bearings 41 through the oil guide holes 26 in the above-described manner, and effectively lubricates the contact portions between the roller elements 43 and the roller element rolling surfaces 32 on the radially outer surfaces of the roller shafts 31 and the contact portions between the roller elements 43 and the raceways formed on the inner peripheries of the outer races 42.

Figure 13:
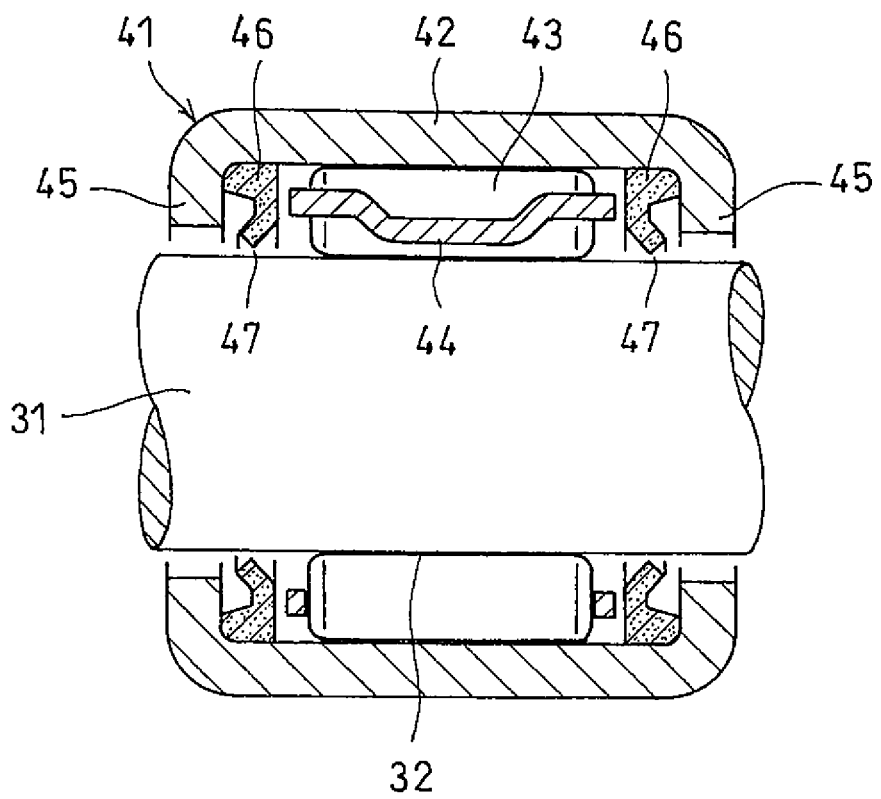
FIG. 13 is sectional view of a different roller element bearing.

Oil used to lubricate the roller element bearings 41 may contain foreign substances, and if such foreign substances enter any of the roller element bearings 41, foreign substances could become wedged between moving parts of the roller element bearing 41, thus damaging the roller element bearing 41. By providing the respective roller element bearings 41 with seals 46 in the open end portions thereof as shown in FIG. 13 to prevent entry of foreign substances, it is possible to prevent damage to the rollers bearings 41, thereby improving their durability.

However, if such seals 46 have their radially inner portions in elastic contact with the radially outer surfaces of the roller shafts 31, it becomes impossible to introduce lubricating oil into the respective outer races 42. Thus, it is necessary that the seals 46 have inner diameters larger than the outer diameters of the roller shafts 31 so that gaps 47 are defined between the radially inner surfaces of the seals 46 and the roller element rolling surfaces of the roller shafts 31.

Figure 5:
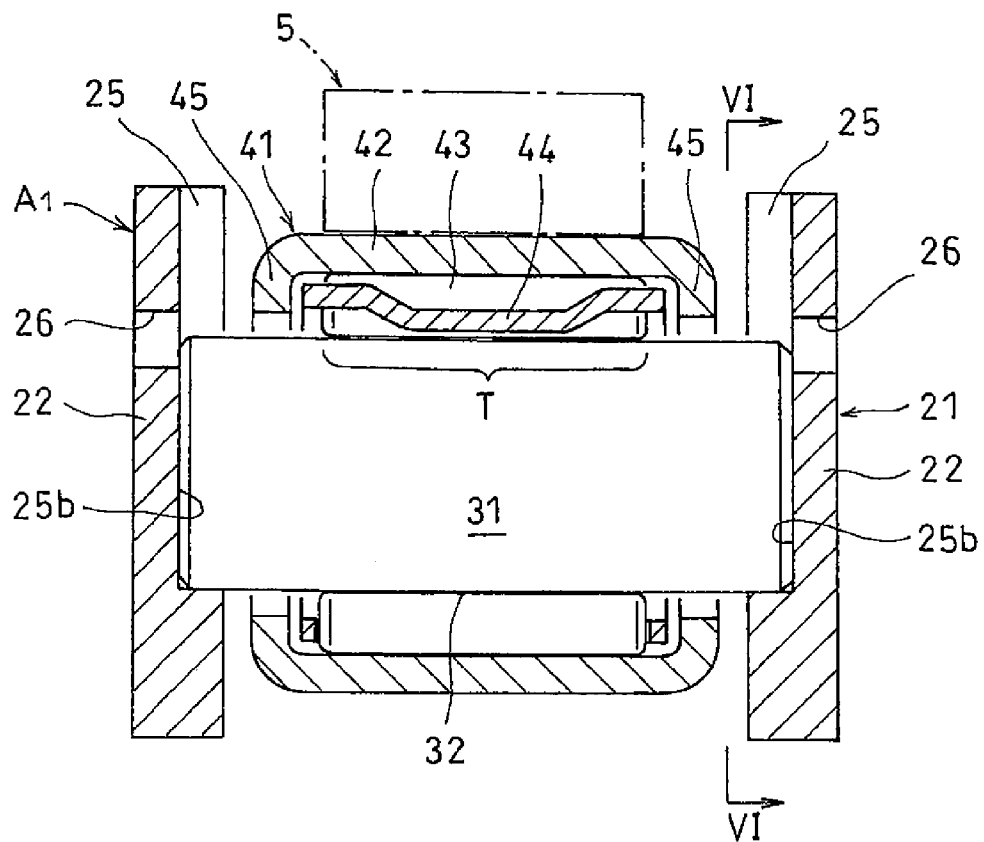
FIG. 5 is a sectional view showing different side plates of the guide base.
Figure 6:
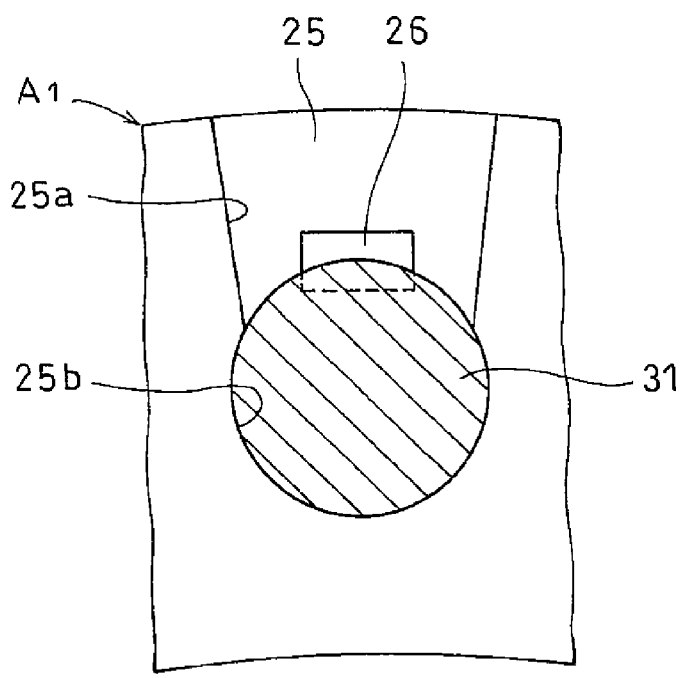
FIG. 6 is a sectional view taken along line VI-VI of FIG. 5.

In the embodiment of FIGS. 3 and 4, the oil guide holes 26 are formed in the wall surfaces of the tapered groove sections 25a, but as shown in FIGS. 5 and 6, the oil guide holes 26 may be formed in the respective side plates 22 so as to lie on the extensions of the contact portions between the roller elements 43 in the loaded regions T of the respective bearings, where radial loads are applied, and the roller element rolling surfaces 32 on the outer peripheries of the roller shafts 31. With this arrangement, oil flowing into the oil guide holes 26 more smoothly flows into the roller element bearings 41, so that oil can be effectively introduced into the roller element bearings 41.

In the embodiment of FIGS. 3 and 4, each of the shaft engaging portions 25, which support the respective ends of the roller shafts 31, comprises the tapered groove section 25a and the shaft support section 25b, which is connected to the narrow end of the tapered groove section 25a, and arranged such that narrow end of the tapered groove section 25a prevents the roller shaft 31 from being pulled out. However, the shaft engaging portions 25 are not limited to those shown in FIGS. 3 and 4.

Figure 7:
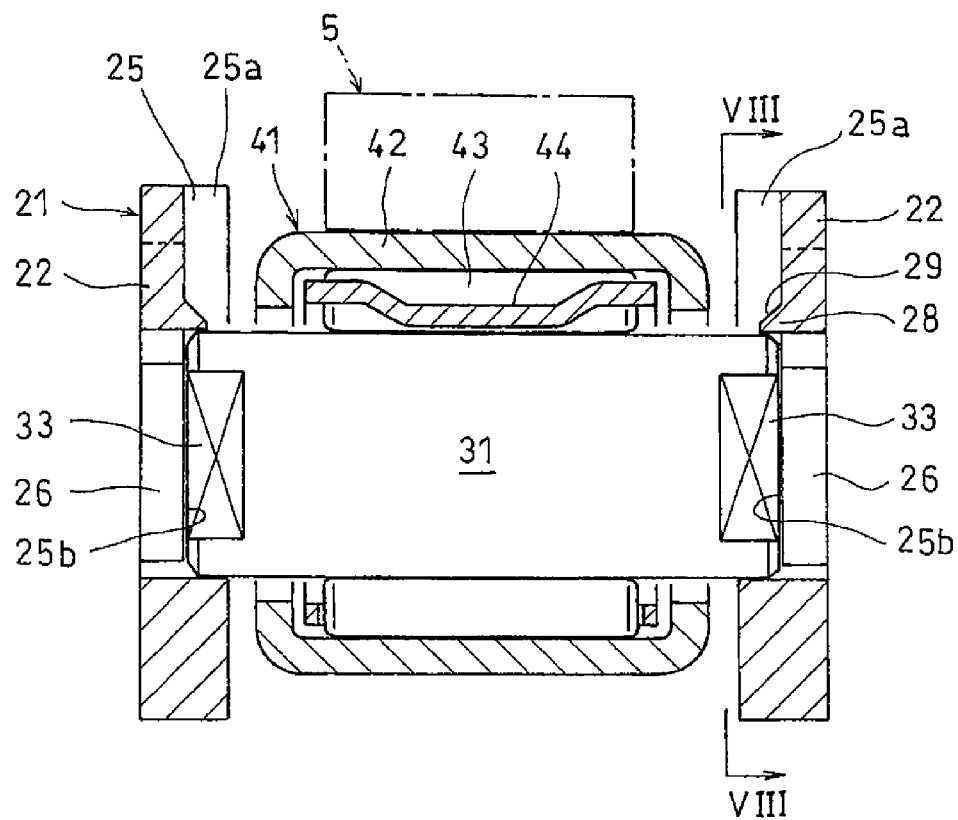
FIG. 7 is a sectional view showing different shaft engaging portions.
Figure 8:
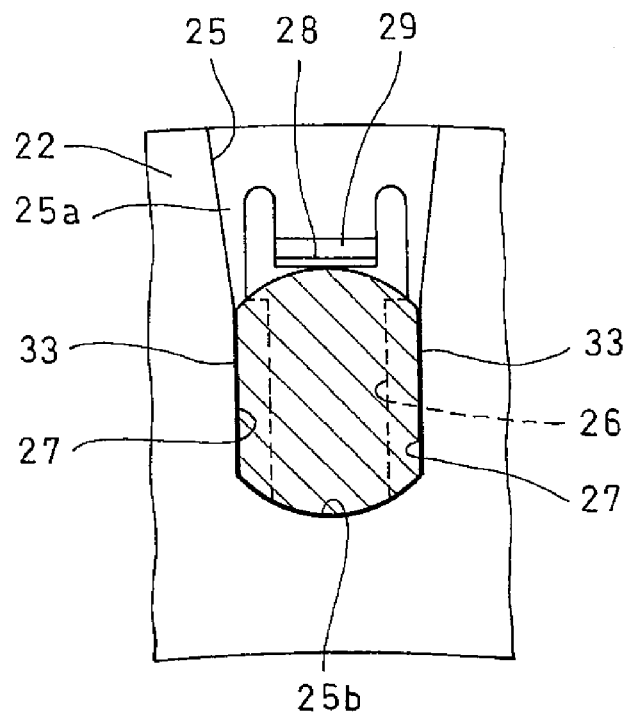
FIG. 8 is a sectional view taken along line VIII-VIII of FIG. 7.

FIGS. 7 and 8 show different shaft engaging portions 25. As with the shaft engaging portions 25 shown in FIGS. 3 and 4, those shown in FIGS. 7 and 8 each comprise a tapered groove section 25a and a shaft support section 25b which is connected to the narrow end of the tapered groove section 25a. The shaft support section 25b is formed with opposed flat surfaces 27 on the inner wall thereof which is brought into surface contact with flat surfaces 33 formed on the outer periphery of the corresponding end of the roller shaft 31, thereby preventing rotation of the roller shaft 31. The tapered groove section 25a has side surfaces connected to the ends of the respective flat surfaces 27 so as to be moderately inclined outwardly from the ends of the flat surfaces 27.

The shaft support section 25b has a wall surface facing the end surface of the roller shaft 31 and formed with an oil guide hole 26 having one side thereof protruding into the tapered groove section 25a. An elastically deformable anti-separation protrusion 28 is formed along the one side of the oil guide hole 26 so as to engage the upper portion of the outer periphery of the roller shaft 31 at its end portion, thereby preventing the roller shaft 31 from being pulled out of the shaft support section 25b. The anti-separation protrusion 28 has an inclined guide surface 29 on the upper portion of its outer periphery.

When the roller shafts 31 are inserted into the shaft engaging portions 25 of FIGS. 7 and 8, the end surfaces of the roller shafts 31 press the guide surfaces 29 of the respective anti-separation protrusions 28, thereby smoothly elastically deforming the anti-separation protrusions 28 so as to permit passage of the ends of the shafts through the respective anti-separation protrusions 28. When the ends of the roller shafts 31 pass through the respective anti-separation protrusions 28 and are supported by the shaft support sections 25b, the anti-separation protrusions 28 elastically return to their original shape, thus engaging the outer peripheries of the roller shafts 31 at their ends. The roller shafts 31 can thus be smoothly mounted in position.

If the guide base 21 is formed of a synthetic resin, the side plates 22 may be formed by molding with the roller shafts 31 inserted in the respective roller element bearings such that the ends of the roller shafts 31 are embedded in the side plates 22.

Figure 9:
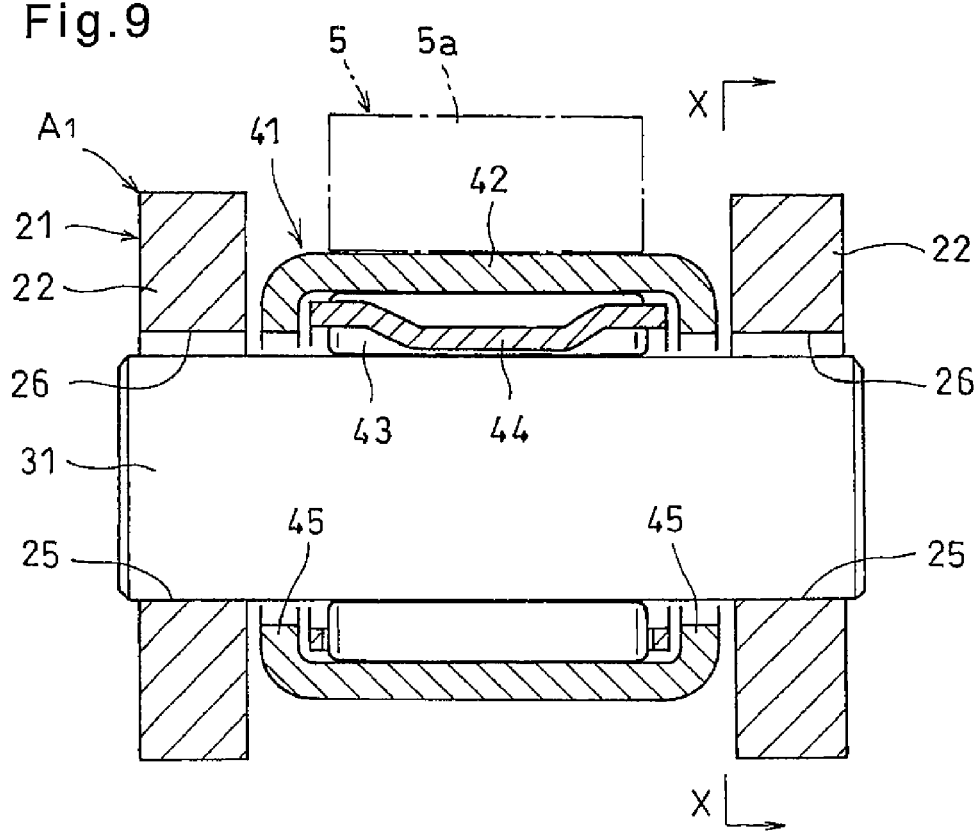
FIG. 9 is a sectional view of a different chain guide.
Figure 10:
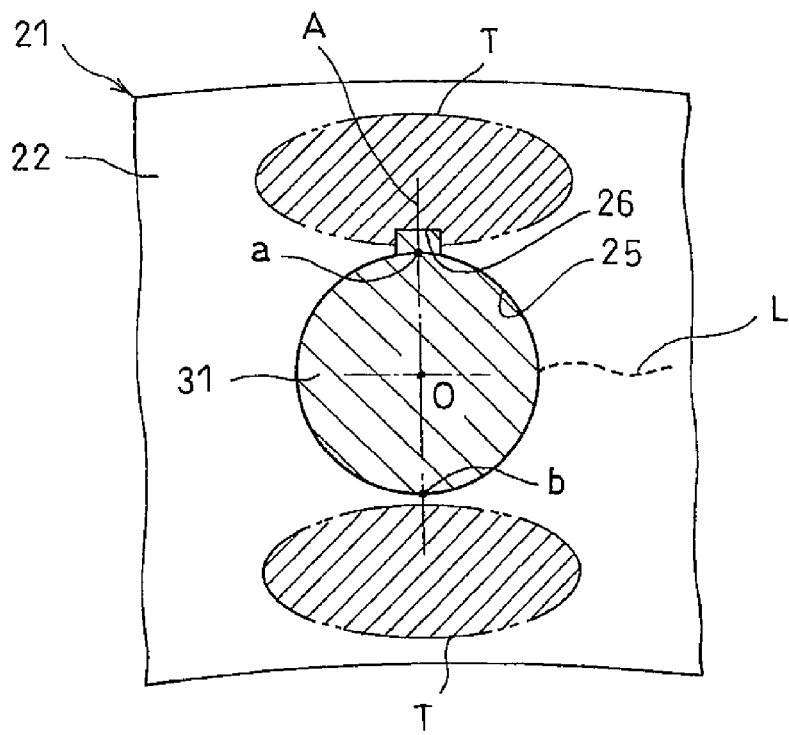
FIG. 10 is a sectional view taken along line X-X of FIG. 9.

FIGS. 9 and 10 show still different shaft engaging portions 25. These shaft engaging portions 25 are in the form of shaft holes extending through the side plates 22 from one to the other side thereof, each shaft hole having an oil guide hole 26 comprising an axial groove formed in the inner periphery of the shaft hole.

Since the chain guides $A_1$ and $A_2$, which are mounted in an engine room, are exposed to high ambient temperature, and also, the rollers 41 are rotated at high speed due to contact with the timing chain 5, the roller shafts 31 tend to be heated to high temperature due to contact with the rollers 31.

In FIGS. 9 and 10, since the shaft engaging portions 25, which support the ends of the roller shafts 31, are in the form of shaft holes extending through the side plates from one to the other side thereof, the roller shafts 31 are supported with their end surfaces exposed to the outside. This allows heat dissipation from the end surfaces of the roller shafts 31, thus reducing the possibility of the roller shafts 31 being heated to high temperature. This prevents the guide base 21, which is formed by molding, from being heated to high temperature due to heat conducted from the roller shafts 31, and thus prevents reduction in strength of the guide base 21.

In the embodiment in which the shaft engaging portions 25 are in the form of shaft holes extending through the side plates from one to the other side thereof, when the guide base 21 is formed by molding a resin in molds, the flow of molten resin is divided into two at a position upstream of each shaft hole 25, and the thus divided flows of molten resin meet at a position downstream of the shaft hole 25. When the divided flows meet, they are not mixed together and thus form a weld line. Since the guide base 21 is low in strength at such weld lines, if the weld lines form in loaded regions, the guide base 21 tends to be damaged and thus its durability decreases.

The loaded regions of the guide base 21 refer to the portions of the guide base 21 where high loads are applied from the timing chain 5 through the rollers 41 and the roller shafts 31. The loaded regions of the guide base 21 are indicated by the two-dot chain lines T in FIG. 10.

Figure 12:
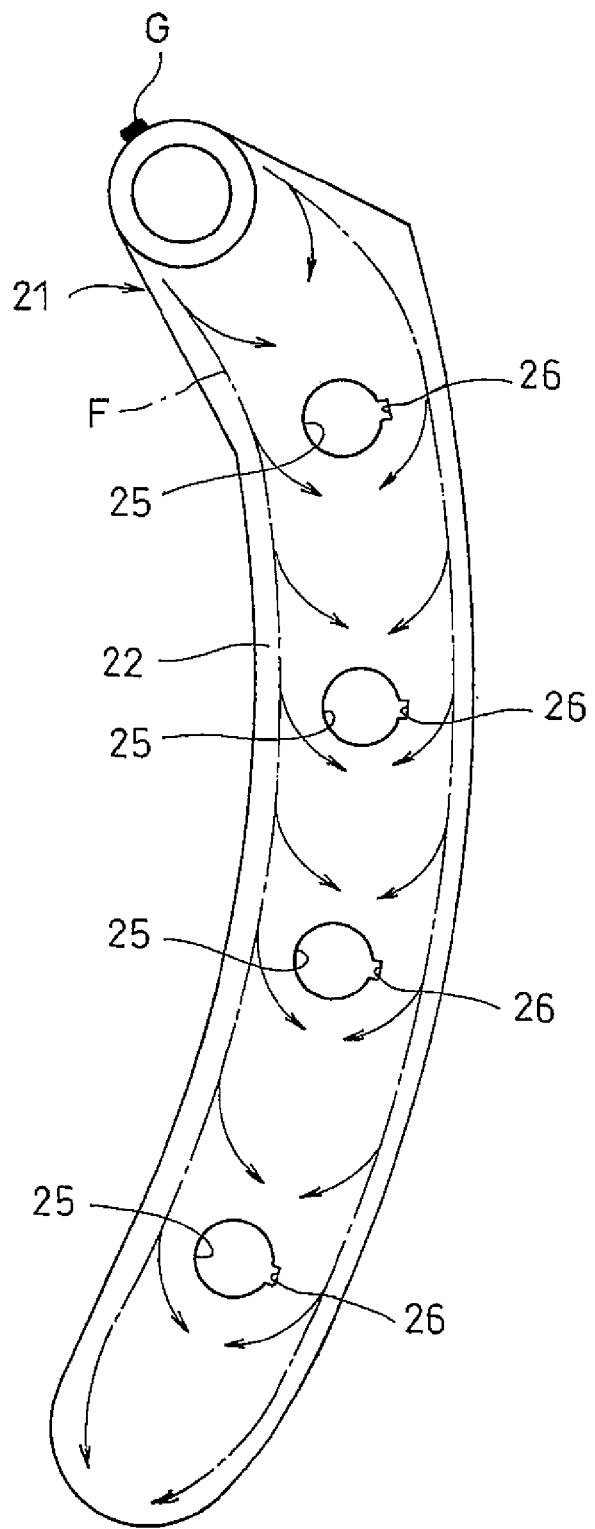
FIG. 12 is a front view of a guide base showing the flow resin when forming the guide base by resin molding.

In the embodiment of FIG. 12, in order to prevent formation of weld lines in the loaded regions T of the guide base 12, in forming the guide base 12 by molding, molten resin is discharged through a gate G at one or the other longitudinal end of each side plate 22 of the guide base 21, to be formed, such that molten resin flows in the direction in which the shaft holes 25 are to be arranged, as shown by the arrows F in FIG. 12.

With this arrangement, as shown in FIG. 10, none of the loaded regions T of the guide base 21 exists at a position downstream of each shaft hole 25, where the flows of molten resin that have been divided into two at a position upstream of the shaft hole 25 meet again and form a weld line L. This means that none of the weld lines L forms in any of the loaded regions T of the guide base 21. The guide base 21 thus obtained has sufficient strength and is sufficiently durable.

As shown in FIG. 10, the guide base 21 is formed such that each weld line L is located between the intersections "a" and "b" between the circular inner surface of each shaft hole 25 and the diametric line A that passes the center O of the circular inner surface of the shaft hole 25 and extends in the width direction of the side plate 22. In the embodiment, the guide base 21 is formed such that the weld line L is located on the horizontal line that passes the center O of the shaft hole 25 (namely, the line perpendicular to the line A) so that the weld line L is located farthest from the loaded regions T in the region between the intersections "a" and "b".

Figure 11:
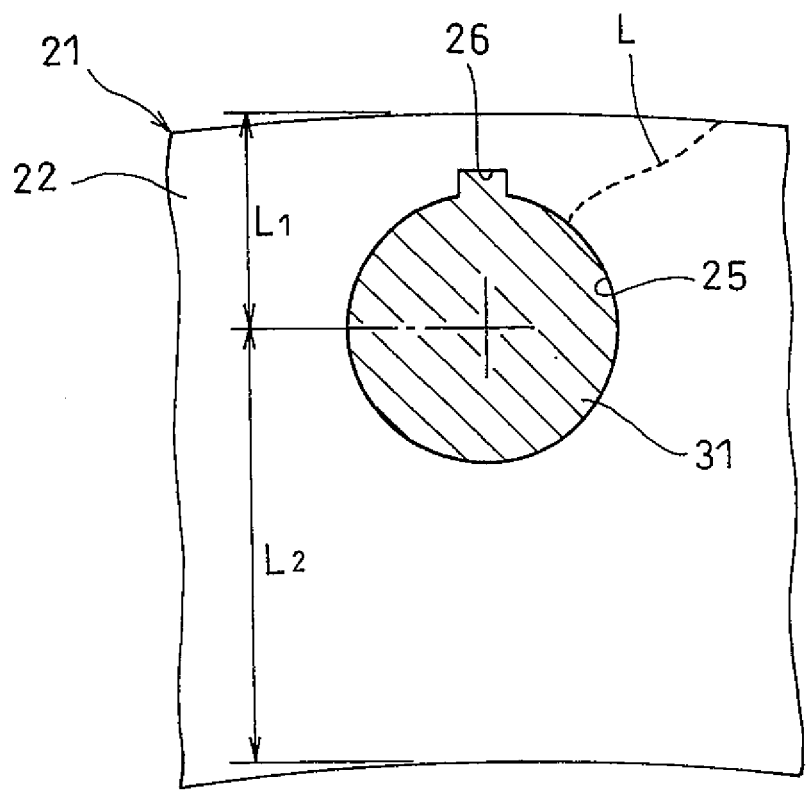
FIG. 11 is a sectional view of a still different chain guide.

Referring to FIG. 11, it is possible to reliably prevent formation of weld lines L in the loaded regions T shown in FIG. 10 by determining the ratio of $L_1$ to $L_2$ at 1 to 3 or less, where $L_1$ is the distance between the center of each shaft hole 25 and one of the peripheral surfaces of the corresponding side plate 22, and $L_2$ is the distance between the center of each shaft hole 25 and the other of the peripheral surfaces of the side plate 22.

For the same purpose, the ratio of $L_2$ to $L_1$ may be determined at 1 to 3 or less too.

DESCRIPTION OF THE NUMERALS $A_1$. Chain guide
$A_2$. Chain guide
2. Driving sprocket
4. Driven sprocket
5. Timing chain (chain)
21. Guide base
22. Side plate
25. Shaft engaging portion (shaft hole)
25a. Tapered groove section
25b. Shaft support section
26. Oil guide hole
27, 33. Flat surface
28. Anti-separation protrusion
31. Roller shaft
32. Roller element rolling surface
41. Roller (roller element bearing)
42. Outer race
43. Roller element
46. Seal
47. Gap

What is claimed is:

1. A chain guide comprising:
    a guide base including an opposed pair of side plates elongated in one direction and configured to be arranged along a portion of an outer periphery of a timing chain such that the one direction coincides with a direction in which the timing chain moves, wherein each of the side plates is formed with shaft engaging portions that are opposed to the respective shaft engaging portions of the other of the side plates;
    a plurality of roller shafts arranged spaced apart from each other in a length direction of the side plates, and having end portions supported by the respective shaft support portions; and
    a plurality of rollers rotatably supported by the respective roller shafts and configured to guide the timing chain, wherein the rollers comprise roller element bearings each including an outer race and a plurality of roller elements mounted in the outer race,
    wherein oil guide holes are formed in each of the side plates at or around the respective shaft engaging portions to extend through the side plate from an inner side surface to an outer side surface, of the side plate.

2. The chain guide of claim 1, wherein the roller shafts are formed with roller element rolling surfaces on outer peripheries of the roller shafts, wherein each of the roller element rolling surfaces is in contact at a contact portion with one of the roller elements of a corresponding one of the roller element bearings that lies in a loaded region where radial loads are applied to the one of the roller elements, and wherein the oil guide holes lie on extensions of the respective contact portions.

3. The chain guide of claim 1, wherein the guide base is formed by molding, and wherein the oil guide holes are formed while the guide base is being formed by molding.

4. The chain guide of claim 1, wherein each of the roller element bearings further comprises seals mounted at respective open ends of the outer race with gaps defined between radially inner surfaces of the respective seals and a radially outer surface of a corresponding one of the roller shaft, and wherein the seals are configured to prevent entry of foreign matter into the respective roller element bearings.

5. The chain guide of claim 1, wherein each of the shaft engaging portions comprises a tapered groove section extending from an outer peripheral surface of a corresponding one of the side plates facing the timing chain in a width direction of the side plate, and a circular shaft support section connected to a narrow end of the tapered groove section and configured to support one end of one of the roller shafts, wherein the narrow end of the tapered groove section is configured to prevent the end of the roller shaft from being pulled out of the shaft support section, and wherein the oil guide holes are formed in the respective tapered groove sections.

6. The chain guide of claim 1,
    wherein each of the shaft engaging portions comprises a tapered groove section extending from an outer peripheral surface of a corresponding one of the side plates facing the timing chain in a width direction of the side plate, and a shaft support section connected to a narrow end of the tapered groove section and configured to support one end of one of the roller shafts, and wherein for each of the shaft engaging portions:
    (a) the shaft support section has on an inner periphery thereof an opposed pair of first flat surfaces which are kept in surface contact with second flat surfaces formed on an outer periphery of the one of the roller shafts at the one end thereof, thereby preventing rotation of the one of the roller shafts;
    (b) the tapered groove section has side surfaces connected to ends of the respective first flat surfaces;
    (c) the tapered groove section has a wall surface facing an end surface of the one of the roller shafts and formed with an anti-separation protrusion kept in engagement with the outer periphery of the one end of the one of the roller shafts; and (d) the tapered groove section is formed with one of the oil guide holes.

7. The chain guide of claim 1, wherein the shaft engaging portions comprise shaft holes extending through the respective side plates from one to the other side surface of each of the side plates, wherein the oil guide holes are groove-shaped oil guide holes formed in radially inner surfaces of the respective shaft holes, wherein the side plates are formed from a molten material by passing the molten material in a direction in which the shaft holes are to be arranged, such that a weld line is formed at a position downstream of each of the shaft holes.

8. The chain guide of claim 7, wherein the molten material is a synthetic resin or a light metal.

9. The chain guide of claim 7, wherein a ratio of $L_1$ to $L_2$ is 1/3 or less, where $L_1$ is a distance between a center of each of the shaft holes and one of two peripheral surfaces of a corresponding one of the side plates, and $L_2$ is a distance between the center of each of the shaft holes and the other of the two peripheral surfaces.

10. A chain transmission device comprising a driving sprocket, a driven sprocket, a timing chain trained around the driving sprocket and the driven sprocket, a pivotable chain guide provided on one side of a slack side of the timing chain so as to be pivotable about one end of the chain guide, and configured to guide a movement of the timing chain, and a chain tensioner configured to apply an adjusting force to a remote end of the chain guide remote from the one end of the chain guide so as to press the remote end against the timing chain, wherein the chain guide is the chain guide of claim 1.

11. A chain transmission device comprising a driving sprocket, a driven sprocket, a timing chain trained around the driving sprocket and the driven sprocket, a pivotable chain guide provided on one side of a slack side of the timing chain so as to be pivotable about one end of the chain guide, and configured to guide a movement of the timing chain, a chain tensioner configured to apply an adjusting force to a remote end of the chain guide remote from the one end of the chain guide so as to press the remote end against the timing chain, and a stationary chain guide provided on one side of a tension side of the chain guide and configured to guide the movement of the timing chain, wherein at least one of the pivotable chain guide and the stationary chain guide is the chain guide of claim 1.

* * * * *